US011276235B2

(12) United States Patent
Folgoas et al.

(10) Patent No.: US 11,276,235 B2
(45) Date of Patent: Mar. 15, 2022

(54) METHOD AND SYSTEM FOR PROJECTING A PATTERN IN MIXED REALITY

(71) Applicant: SOCIETE BIC, Clichy (FR)

(72) Inventors: Loïc Folgoas, Paris (FR); Etienne Roudaut, La Garenne Colombes (FR)

(73) Assignee: SOCIETE BIC, Clichy (FR)

(*) Notice: Subject to any disclaimer, the term of this patent is extended or adjusted under 35 U.S.C. 154(b) by 0 days.

(21) Appl. No.: 16/772,224

(22) PCT Filed: Dec. 13, 2018

(86) PCT No.: PCT/FR2018/053259
§ 371 (c)(1),
(2) Date: Jun. 12, 2020

(87) PCT Pub. No.: WO2019/115951
PCT Pub. Date: Jun. 20, 2019

(65) Prior Publication Data
US 2021/0074066 A1 Mar. 11, 2021

(30) Foreign Application Priority Data

Dec. 14, 2017 (FR) ...................................... 1762176

(51) Int. Cl.
G06T 19/00 (2011.01)
G06T 7/33 (2017.01)
(Continued)

(52) U.S. Cl.
CPC ............ G06T 19/006 (2013.01); G06F 3/017 (2013.01); G06T 5/006 (2013.01); G06T 7/33 (2017.01);
(Continued)

(58) Field of Classification Search
None
See application file for complete search history.

(56) References Cited

U.S. PATENT DOCUMENTS

2010/0091112 A1* 4/2010 Veeser ................. G06K 9/2036
348/207.1
2013/0222381 A1* 8/2013 Di Censo ............. G06F 3/0304
345/424

(Continued)

OTHER PUBLICATIONS

Kolomenski, Andrei A. Realization of a Spatial Augmented Reality System—A Digital Whiteboard Using a Kinect Sensor and a PC Projector. Diss. 2013.*

(Continued)

Primary Examiner — Ryan M Gray
(74) Attorney, Agent, or Firm — Bookoff McAndrews, PLLC

(57) ABSTRACT

A method and a system for projecting a pattern onto a real surface, comprising: an image acquisition module; a video projector; a processor; and a memory comprising instructions that can be executed by the processor in order to: acquire an image on which a real surface is at least partially visible by means of said image acquisition module; determine a geometric transformation to be applied to said pattern such that once the pattern is projected by a video projector, it appears in a predefined location on the real surface, the determination of the geometric transformation taking into account the position of the video projector and the position of said real surface obtained by means of said acquired image; apply the geometric transformation to said pattern; and project the pattern by means of the video projector.

19 Claims, 5 Drawing Sheets

(51) Int. Cl.
  *G06F 3/01* (2006.01)
  *G06T 5/00* (2006.01)
  *G06T 17/00* (2006.01)
(52) U.S. Cl.
  CPC .... *G06T 17/00* (2013.01); *G06T 2207/10016* (2013.01)

(56) References Cited

U.S. PATENT DOCUMENTS

| | | | | |
|---|---|---|---|---|
| 2015/0040074 | A1* | 2/2015 | Hofmann | G06F 3/04815 715/852 |
| 2015/0262426 | A1* | 9/2015 | Marner | G06F 3/011 345/419 |
| 2016/0098862 | A1* | 4/2016 | Wilson | H04N 9/3185 345/419 |
| 2016/0371884 | A1* | 12/2016 | Benko | G02B 27/017 |

OTHER PUBLICATIONS

Marner, Michael R., Bruce H. Thomas, and Christian Sandor. "Physical-virtual tools for spatial augmented reality user interfaces." 2009 8th IEEE International Symposium on Mixed and Augmented Reality. IEEE, 2009.*

Kim, Jeongyun, Jonghoon Seo, and Tack-Don Han. "AR Lamp: interactions on projection-based augmented reality for interactive learning." Proceedings of the 19th international conference on Intelligent User Interfaces. 2014.*

Thomas, Bruce H., et al. "Spatial augmented reality—A tool for 3D data visualization." 2014 IEEE VIS International Workshop on 3DVis (3DVis). IEEE, 2014.*

Punpongsanon, Parinya, Daisuke Iwai, and Kosuke Sato. "Softar: Visually manipulating haptic softness perception in spatial augmented reality." IEEE transactions on visualization and computer graphics 21.11 (2015): 1279-1288.*

Laviole, J. et al., "Interaction en Réalité Augmentée Spatiale pour le Dessin Physique (Spatial Augmented Reality for Physical Drawing)," Ph.D. Dissertation, University of Bordeaux, France, pp. 1-102 (2013).

Bandyopadhyay, D. et al., "Dynamic Shader Lamps: Painting on Movable Objects," IEEE and ACM International Symposium on Augmented Reality, pp. 207-216 (2001).

Rosenthal, S. et al., "Augmenting On-Screen Instructions with Micro-Projected Guides: When it Works, and When it Fails," Proceedings of the 12th ACM International Conference on Ubiquitous Computing, Ubicomp, pp. 203-212 (2010).

Iarussi, E. et al., "The Drawing Assistant: Automated Drawing Guidance and Feedback from Photographs," Proceedings of the 26th Annual ACM Symposium on User Interface Software and Technology, UIST, pp. 183-192 (2013).

Audet, S. et al., "A User-Friendly Method to Geometrically Calibrate Projector-Camera Systems," Computer Vision and Pattern Recognition Workshops, pp. 47-54 (2009).

International Search Report and Written Opinion issued in International Application PCT/FR2018/053259, dated Feb. 25, 2019, with English Translation (15 pages).

* cited by examiner

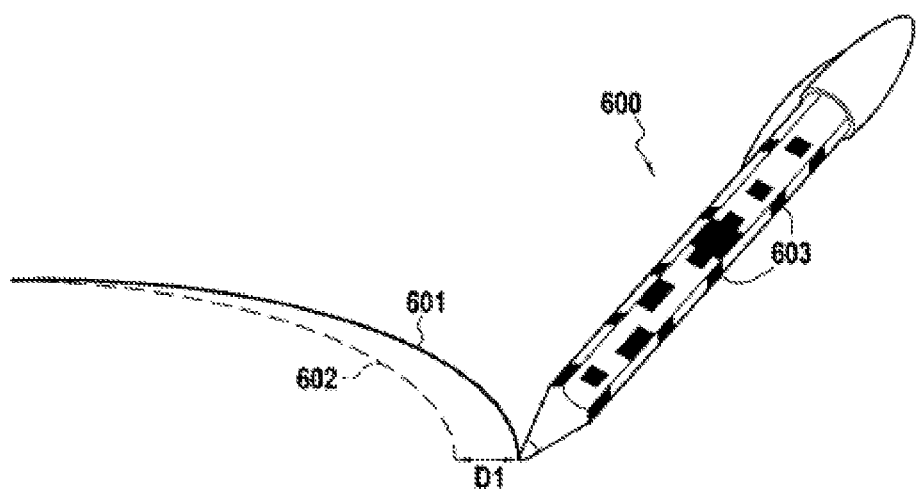
FIG.6
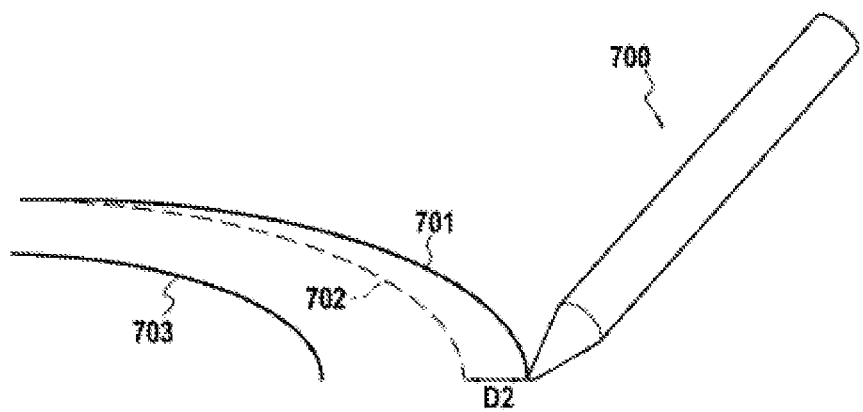
FIG.7
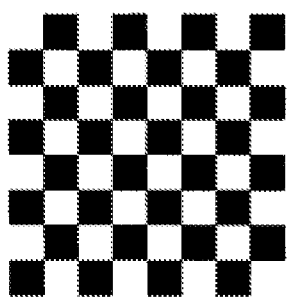 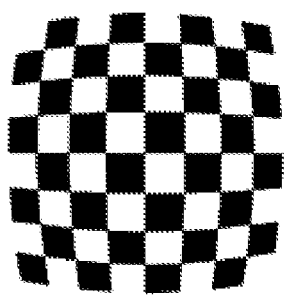 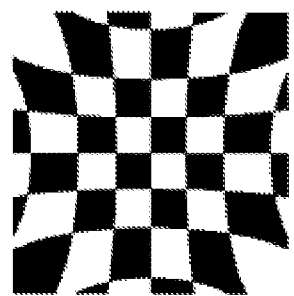
FIG.8A  FIG.8B  FIG.8C

METHOD AND SYSTEM FOR PROJECTING A PATTERN IN MIXED REALITY

CROSS REFERENCE TO RELATED APPLICATION(S)

This application is a National Stage Application of International Application No. PCT/FR2018/053259, filed on Dec. 13, 2018, now published as WO2019/115951 and which claims priority to French Application No. FR1762176, filed on Dec. 14, 2017.

BACKGROUND

The present disclosure relates to the general field of mixed reality, sometimes also referred to as hybrid reality, and relates more particularly to a method of projecting a pattern on a real surface.

Mixed reality is a technology that makes it possible to fuse a virtual world with the real world, in order to produce a new environment and visualizations in which physical objects of the real world, and digital objects of the virtual world, coexist and can possibly interact, for example in real time. This technology is used more and more, in particular in the field of entertainment, e.g. video games or in the world of business, e.g. immersive learning content.

In order to obtain this fusion, it is possible to use any information display means, in particular a display screen, augmented reality or mixed reality glasses, such as the "Microsoft Hololens" glasses (registered trademark), or even a video projector.

An example of use of mixed reality is that of visualizing a virtual item of furniture arranged such that it can be seen by a user at a location in a room.

The current mixed reality techniques only allow for visualization of objects, and do not make it possible to implement a preview which would make the performance of an action on a real object sufficiently easier for a user.

There is therefore a need for new applications in mixed reality.

The disclosure aims in particular to overcome these disadvantages.

SUMMARY

The present disclosure meets this need by proposing a method of projecting a pattern on a real surface, the method comprising:
  acquiring an image on which the real surface is visible at least in part,
  determining a geometric transformation to be applied to the pattern such that, once projected by a video projector, the pattern appears in a predefined position of the real surface, i.e. in a predefined location and having a predefined shape or a predefined operation, the determination of the geometric transformation taking account of the position of the video projector and of the position of the real surface obtained by means of the acquired image,
  applying the geometric transformation to the pattern,
  projecting the pattern by means of the video projector. In other words, projecting the pattern after the geometric transformation has been applied, which makes it possible to ensure that the pattern appears at the predetermined position of the real surface.

In the present description, the term "position" refers both to the location and to the orientation. Alternatively, a person skilled in the art may generally use the term "pose."

The surface is referred to as the real surface because it is not part of a virtual world. Indeed, the real surface is a surface in the users' three-dimensional space, and thus has its own location in space. It can be noted that the virtual world is a three-dimensional space which exists only digitally.

The pattern exists initially in the virtual world, i.e. in digital form, for example a drawing recorded in the form of a raster or vector image. By being projected onto the real surface, the pattern appears in the real world, and therefore the method as defined above is a mixed reality method.

The video projector may be in such a position that, when the pattern is projected onto the real surface without geometric transformation, the pattern may appear in an undesired location or may even appear such that it is deformed. This results in particular from the position of the video projector relative to that of the real surface, the optical properties of the video projector, etc.

The geometric transformation can therefore be determined such that the pattern appears in a predefined location. In examples, the pattern appears having a shape (appearance) that is also predefined, such that the deformation or shift effects do not appear.

The location is predefined because it is selected, for example by a user, before the method is implemented.

A person skilled in the art knows how to implement image-processing techniques on the acquired image, in order to determine how the real surface is positioned.

Knowing the position of the video projector, and that of the real surface, since these two positions are in the real world, it is possible to obtain the geometric transformation.

Indeed, determining the geometric transformation can comprise a step of registering a virtual world relative to the real world, carried out on the basis of detection of the real surface and possibly the position of the projector. This makes it possible to first of all determine, in the virtual world, the way in which, from the perspective of the projector in the virtual world, the pattern must appear on the real surface, in order to deduce therefrom the transformation to be applied to the pattern, and to project the transformed pattern.

The method can make it possible to pre-visualize a drawing on the real surface before this is carried out. In other words, the method is used as a drawing aid.

For example, a pattern to be drawn is projected onto the real surface. For greater ease, the user turns the real surface. A new image may be acquired, and this makes it possible to determine that a rotation must be applied to the pattern in order to project the pattern such that it appears in the same location of the real surface. This facilitates creation of a drawing on the real surface.

It will be noted that the real surface may be planar or non-planar.

According to one embodiment, an image is acquired on which at least a portion of a marking associated with the real surface is visible, the at least one portion of the marking is detected, and the determination of the geometric transformation takes account of the detection of the marking.

For example, the marking may be printed, stuck or placed on the real surface so as to be firmly associated therewith. A person skilled in the art knows to select a marking which can be detected on an acquired image, and which makes it possible to detect the position of the real surface.

For example, the marking may be a square marking having a pattern comprising particular points. The marking may in particular comprise a non-symmetrical black-and-white pattern (or one having a high contrast ratio).

By way of illustration, if the marking is in gray-scale, and the color white is associated with a black intensity of 0% and the color black is associated with a black intensity of 100%, then a marking may be used that has elements having a black intensity difference of at least 70 points, which corresponds to a high contrast ratio. For example, it is possible to use a gray at 15% black and a gray at 85% black, or a white at 0% black and a gray at 70% black.

It is also possible to use a colored pattern having colors associated with black intensities separated by 70 points. For example a pale yellow at 10% black and a dark blue at 80% black.

Alternatively, the marking may be a three-dimensional marking. This embodiment is particularly suitable for the use of an image acquisition module of the RGB-D type, "Red, Green, Blue, and Depth", which is an acronym that is well known to a person skilled in the art.

It can also be noted that the marking can be placed on a movable support in order to be associated with the real object. For example, the support may be flexible and comprise means for attaching the support to itself, for example so as to surround the real surface or to the real surface.

It is possible in particular to select a marking which surrounds the real surface if the surface is the surface of a real object, such that the marking is visible all around the object, so that the object can be turned.

According to one embodiment, the pattern is projected in a zone of the real surface that is separate from that comprising the marking.

This particular embodiment facilitates the implementation of a subsequent step of drawing, because the marking and the elements thereof do not hinder this step.

It can be noted that "separate" is intended, for example, to mean that the zone is spaced apart from the marking by at least a distance of the order of a centimeter.

It can also be noted that using a marking makes it possible to more easily register a virtual world on the real world. Nonetheless, the methods or systems disclosed herein is in no way limited to the use of a marking, since some real surfaces (a person skilled in the art is able to identify which) may have a detectable position due to the shape thereof (for example on the basis of the relative positions of the corners of the surface).

The step of "registration" of a virtual world is intended for aligning the virtual world and the real world. This in particular makes it possible to facilitate the determination of a geometric transformation such that, once projected by a video projector, the pattern appears in a predefined location of the real surface.

The visible portion of the marking makes it possible to determine an orientation of the marking and also a dimension (for example a distance between two elements of the marking). From then on, the visible portion of the marking can be considered to be associated with a real world reference point (for example an orthonormal reference point), and a virtual reference point will be developed on the basis of the real world reference point. The virtual reference point thus developed makes it possible to determine the geometric transformation.

According to a particular embodiment, at least a portion of an additional marking associated with the real surface is furthermore visible on the image, the at least one portion of the additional marking is detected, and the determination of the geometric transformation takes account of the detection of the marking.

Thus, the method is in no way limited to the use of a single marking, and it is possible to use one or more additional markings in order to facilitate the detection of the real surface.

According to a particular embodiment, the geometric transformation comprises a homography. The homography may comprise rotation and/or translation and/or homothety.

For example, a person skilled in the art knows to determine the homography by means of determining a homothety coefficient, a translation matrix and a rotation matrix, on the basis of knowledge of the position of the video projector, the detection of the position of the real surface, and finally the expected position of the projected pattern.

According to a particular embodiment, the real surface is a surface of a three-dimensional real object, the method further comprising:
registering a virtual world on the basis of the image, possibly by means of a marking,
placing a three-dimensional virtual object in the registered virtual world,
applying the pattern to the three-dimensional virtual object,
the projection of the pattern comprising projection of the pattern applied to the three-dimensional virtual object and that as viewed from a perspective associated with the video projector.

It can be noted that the perspective of the video projector can be located approximately at the outlet of the optical system of the video projector.

It can be noted that the application of the pattern to the three-dimensional virtual object can use techniques generally designated, by a person skilled in the art, as "texture mapping."

A person skilled in the art in particular knows how to apply textures to virtual three-dimensional objects such as three-dimensional meshes.

It will be noted that, since the three-dimensional virtual object selected has a shape similar to that of the real three-dimensional object, the pattern will be projected as though it were applied to the real surface. For example, the three-dimensional virtual object can be selected by a user, taking into account the shape of the real object.

This can in particular make it possible to facilitate the previewing of a drawing corresponding to the pattern to be achieved on the real object, and this can also make it possible to facilitate a step of creating a drawing that corresponds to the pattern on the real object.

Indeed, the method may comprise, following the display step, a display of creating a drawing on the real object, it being possible for the drawing to correspond to the pattern.

"As viewed from a perspective associated with the video projector" means that the projection was determined in the virtual world from this perspective.

It will also be noted that, in this embodiment, determining the geometric transformation comprises the steps of placing the three-dimensional virtual object and applying the pattern. The translation and rotation matrices can also be used in this case, as well as a homothety coefficient. In other words, the geometric transformation is a homography.

According to a particular embodiment, the three-dimensional virtual object is selected from a library of three-dimensional virtual objects.

Thus, a user can select a virtual object that has the shape closest to that of the real three-dimensional object. The three-dimensional virtual objects from the library of three-dimensional virtual objects may be meshes that are well-known to a person skilled in the art, or three-dimensional shapes associated with parameters. By way of illustration, a cylindrical three-dimensional shape having a circular base can be associated with a diameter parameter and a height parameter.

According to a particular embodiment, the method comprises a preliminary step of adjusting the three-dimensional virtual object.

The preliminary adjustment step can be performed after prior implementation of some steps of the method, in order to place a (non-adjusted) virtual object in the virtual world.

The preliminary adjustment step may comprise projecting the three-dimensional virtual object (or of a mesh representing it) on the real surface, or of displaying it on a screen in a manner superposed on the acquired real world image. The projection of the three-dimensional virtual object can be achieved by projecting a partially opaque three-dimensional virtual object such that it is possible to view both the real object and the three-dimensional virtual object at the same time. If the three-dimensional virtual object is not perfectly overlaid on the real object, the user can easily see the deviations between the three-dimensional virtual object and the real object.

This adjustment may comprise a displacement, in the virtual world, of the three-dimensional virtual object, or a deformation of the three-dimensional virtual object in the virtual world.

According to a particular embodiment, the adjustment step is implemented by means of receiving a command from a user.

By way of illustration, this step can be implemented by means of an interface for the user.

According to a particular embodiment, the method comprises preliminary calibration of an image acquisition module that is used for the image acquisition, and in which an image is acquired on which a first calibration pattern is visible at least in part.

It is possible, for example, to use a first calibration pattern in the form of a checkerboard, in order to determine whether a distortion appears on the image acquired of the calibration pattern. This may make it possible to determine whether a barrel distortion or pincushion distortion appears when an image is acquired. These distortions are associated with features of the image acquisition module used. A person skilled in the art knows to implement image processing in order that the acquired image is corrected and without distortions.

According to a particular embodiment, the method comprises preliminary calibration of the video projector, and in which a second calibration pattern is projected, and an image is acquired in which the second calibration pattern is visible at least in part.

It is possible, for example, to use a first calibration pattern in the form of a checkerboard (in the virtual world), in order to determine whether a distortion appears on the image acquired of the projected calibration pattern. This may make it possible to determine whether a barrel distortion or pincushion distortion appears when an image is projected. These distortions are associated with features of the video projector used. A person skilled in the art knows to implement image processing in order that the projected image is corrected and without distortions.

According to a particular embodiment, the method comprises a step of detecting the position of a writing instrument on the image.

In particular, it is possible to obtain the position of the point of the writing instrument used.

This embodiment is of particular interest for applications in which a user reproduces the projected pattern using a writing instrument. This makes it possible, for example, to check that the writing instrument is positioned in an expected position.

According to a particular embodiment, the detection of the position of the writing instrument is implemented by means of a detection pattern that is associated with the writing instrument and is visible on the image, at least in part.

For example, it is possible to use a non-repetitive marking as the detection pattern, the marking having a high contrast ratio, such that when a portion of the detection pattern is visible on the acquired image, it is possible to determine the position of the writing instrument.

According to a particular embodiment, an alert is generated if the position of the writing instrument strays from an expected position.

This particular embodiment can comprise determination of a distance between the position of the writing instrument and, for example, the position of the projected pattern.

This can make it possible to help the user draw the pattern, for example by generating projected visual alerts, sound alerts, or even alerts by vibration, in the writing instrument.

According to a particular embodiment, the method comprises a step of detecting a pattern drawn by the user on the real surface.

The drawn pattern may be visible, at least in part, on the acquired image, and it is therefore possible to detect the pattern, for example in order to verify that it corresponds to the projected pattern.

It is also possible to detect the drawn pattern, in order to adapt the projected pattern. For example, a complex pattern may be projected in a plurality of steps, the transition from one step to another taking place following detection that the drawn pattern for a first part of the complex pattern has indeed been drawn.

According to a particular embodiment, an alert is generated if the pattern drawn by the user differs from an expected pattern.

This particular embodiment can comprise determination of distances between the drawn pattern and the position of the projected pattern.

This can make it possible to help the user draw the pattern, for example by generating projected visual alerts, sound alerts, or even alerts by vibration, in the writing instrument.

It is also possible to attribute a score to the user, on the basis of the detection of the projected pattern, for the purpose of entertainment use.

The present disclosure also proposes a system for projecting a pattern on a real surface, comprising:
  an image acquisition module,
  a video projector,
  a processor,
  a memory comprising instructions that can be executed by the processor for:
  acquiring, by means of the image acquisition module, an image on which a real surface is visible at least in part,
  determining a geometric transformation to be applied to the pattern such that, once projected by a video projector, said pattern appears in a predefined location of the real surface, the determination of the geometric transformation taking account of the position of the video projector and of the position of the real surface obtained by means of the acquired image, applying the geometric transformation to the pattern,
projecting the pattern by means of the video projector.

The system can be configured for implementing each embodiment of the method as defined above.

According to a particular embodiment, the system further comprises a marking that is designed to be associated with the real surface, the memory further comprising instructions for detecting at least a portion of the marking, and for determining the geometric transformation, taking account of the detection of the marking.

The present disclosure also proposes a computer program comprising instructions for executing the steps of a method as defined above when the program is executed by a computer.

It should be noted that the computer programs mentioned in the present disclosure can use any programming language and be in the form of source code, object code or intermediate code between source code and object code, such as in a partially compiled form or in any other desired form.

The disclosure also proposes a recording medium that can be read by a computer on which a computer program is saved that comprises instructions for executing the steps of a test method as defined above.

The recording (or information) media mentioned in the present disclosure may be any entity or device that is capable of storing the program. For example, the medium may comprise a storage means, such as a ROM, for example a CD ROM or a ROM having a microelectronics circuit, or even a magnetic recording means, for example a floppy disc or a hard disc.

Alternatively, the recording media may correspond to a transmittable medium such as an electronic or optical signal, which can be sent via an electrical or optical cable, by radio, or by other means. The program may in particular be downloaded from a network of the Internet type.

Alternatively, the recording media may correspond to an integrated circuit in which the program is incorporated, the circuit being designed to carry out or to be used in the carrying out the method in question.

BRIEF DESCRIPTION OF THE DRAWINGS

Other features and advantages of the present disclosure can be found in the following description, with reference to the accompanying drawings which illustrate a non-limiting example.

In the figures:

FIG. 6 shows the detection of the position of a writing instrument, FIG. 7 shows the detection of a drawn pattern, and FIGS. 8A, 8B and 8C show calibration patterns.

DETAILED DESCRIPTION OF AN EMBODIMENT

A method and a system according to a particular embodiment will now be described.

Figure 1:
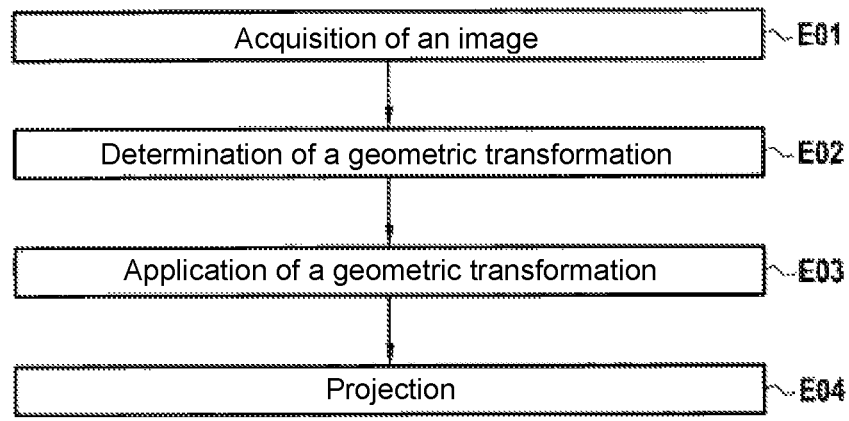
FIG. 1 schematically shows the steps of a method for projecting a pattern on a real surface, FIG. 2 schematically shows a system for projecting a pattern, according to an embodiment.

FIG. 1 schematically shows the steps of a method for projecting a pattern on a real surface.

This method can be implemented by a system comprising a video projector, an image acquisition module such as a camera, and in addition a device that is capable of executing the computer program instructions, comprising a processor, for example a smartphone or a touchpad.

In this method, the pattern is a drawing which is intended to be displayed by means of projection on the real surface, as though it had been applied to the real object. The real surface may be planar, or it may be the surface of a three-dimensional object. This pattern is selected before the method is implemented.

In a first step E01, a real world image is acquired, on which the real surface is visible at least in part.

"Visible at least in part" means that the real surface may be too large to be in the acquired image. Alternatively, if the real surface is the surface of a three-dimensional object, portions of the surface may be hidden due to occlusion.

The real surface is in a position that can be determined by image processing methods, for example if the surface is rectangular it is possible to determine the position of the corners thereof.

Alternatively, the real surface can be associated with the image acquisition module which acquires the image; the position of the real surface is thus fixed, and it is not necessary to detect it on the acquired image.

As will be described in greater detail in the following, it is also possible to use one or more markings for detecting the position of the real surface.

In a second step E02, a geometric transformation to be applied to the pattern is determined such that, once projected by a video projector, the pattern appears in a predefined location of the real surface. This determination takes into account the position of the video projector and the position of the real surface, obtained by means of the image which was acquired during step E01.

By way of illustration, the geometric transformation can be a homography which can comprise a rotation, translation and, in examples, homothety. This step is necessary insofar as the video projector projects an image that can be deformed, according to the position of the video projector relative to the real surface.

In a step E03, the geometric transformation is applied to the pattern.

In step E04, the pattern to which the geometric transformation has been applied is projected.

Steps E01 to E04 can also be defined as computer program instructions. When the computer program is executed by a processor, it in particular controls an image acquisition module, and also a video projector.

Figure 2:
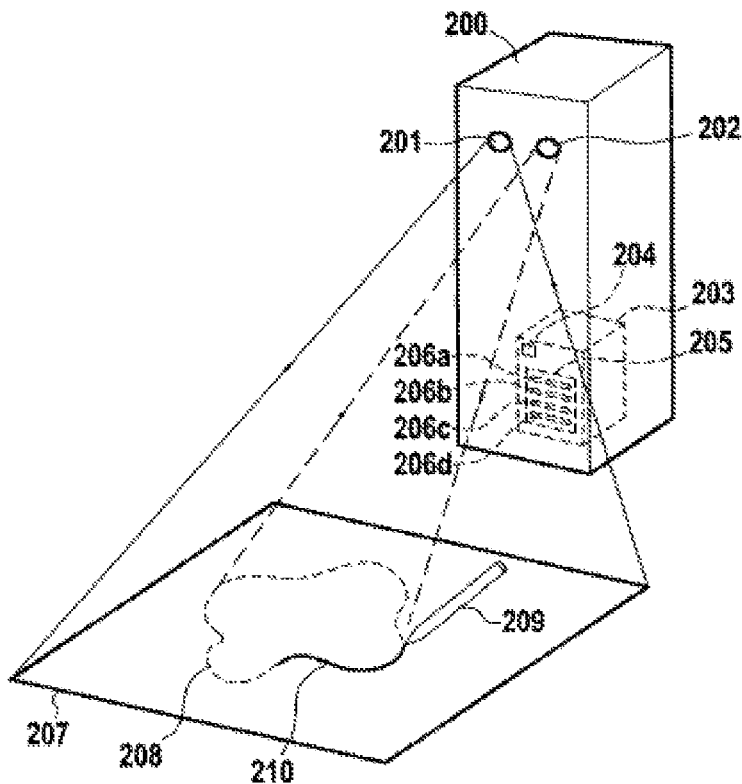

FIG. 2 shows a system 200 for projecting a pattern on a real surface.

This system comprises an image acquisition module 201 of the camera type. It can be noted that, alternatively, the image acquisition module may be an RGB-D image acquisition module. The image acquisition module comprises optical means (not shown here) which make it possible to obtain an image of a selected zone which will be described in the following as being the real surface (or a portion thereof).

The system 200 also comprises a video projector 202 which is also oriented such that it can project patterns on the same zone, referred to as the real surface.

In order to implement the steps of the method as described with reference to FIG. 1, the system 200 comprises a calculation unit 203 which comprises a processor 204 and a memory 205. The memory 205 is a non-volatile memory, and the computer program instructions may have been stored within the memory 205. In this case, computer program instructions 206a, 206b, 206c and 206d have been stored in the memory 505 in order to implement, respectively, steps E01 to E04, described with reference to FIG. 1.

In particular, the instruction 206a implements the step of acquiring an image of a real surface 207, shown in the figure while controlling the image acquisition module 201.

The instruction 206b implements the determination of a geometric transformation of the pattern such that, once projected by a video projector, the projected pattern (denoted 208) appears in a predefined location of the real surface 207, the determination of the geometric transformation taking account of the position of the video projector and of the position of the real surface obtained by means of the acquired image.

The instruction 206c applies the geometric transformation to the pattern.

The instruction 206d controls the video projector so as to project the pattern after the geometric transformation has been applied.

The figure shows the projected pattern 207. The projection can help a user to reproduce the pattern on the surface.

For example, the user may use a writing instrument 209 to draw a pattern 210, while attempting to follow the projected pattern.

It can be noted that, in the example of FIG. 2, the calculation unit 203, the image acquisition module 201 and the projector 202 are all arranged in the same housing. From then on, the position of the video projector is always known.

Alternatively, the calculation unit 203, the image acquisition module 201 and the projector 202 may be integrated in separate devices. For example, the calculation unit 203 may be integrated in a tablet or a smartphone, and the image acquisition module may be the camera of the tablet or of the smartphone.

Figure 3A:
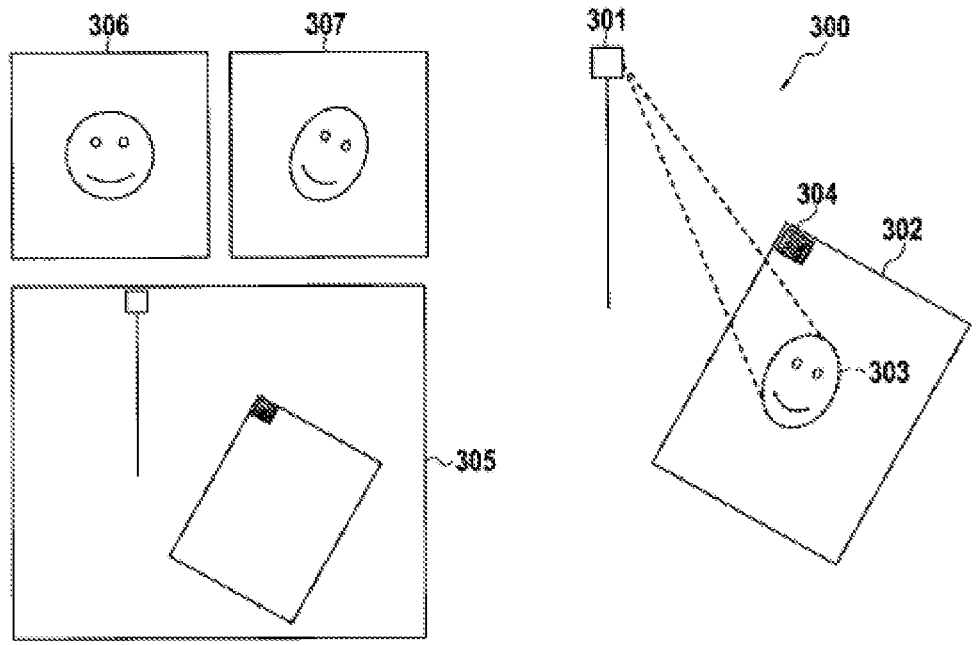
FIGS. 3A and 3B show the projection of a pattern when the real surface is turned.

FIG. 3A shows a system 300 for projecting a pattern. For this purpose, a video projector 301 is used, which is designed to project patterns onto a real surface 302.

In this example, the projected pattern 303 is a smiling face that is intended to be projected in the center of the real surface 302.

In order for the position of the real surface 302 to be known, the real surface is provided with a marking 304. The marking can also be denoted a "target." This term is used in particular in the context of the development kit ("SDK: Software Development Kit") known as Vuforia (registered trade mark), marketed by the American company PTC. Indeed, the marking may be a "target" that is accepted by the Vuforia development kit for mixed reality, for example version 6, dating from August 2016.

A marking of this kind makes it possible to perform a registration of a virtual world with respect to the real world, on the basis of the detection of the marking.

The registration makes it easier to determine the geometric transformation to be applied to the pattern in order for it to appear, as desired, in the center of the real surface 302.

In FIG. 3A, the elements 301 to 304 are shown from the perspective of an image acquisition module. Indeed, the acquired image 305 is also shown in the figure.

The initial pattern is in the form of a digital pattern 306, and has also been shown in the figure. The pattern can be selected by means of a user interface, for example an interface on a tablet.

Determining the transformation aims to define a rotation matrix, a translation matrix, and, in examples, a homothety coefficient, which move the pattern from its original form (denoted 306) to the position that it has to assume in order that, projected by the video projector, it appears, as desired, in the center of the real surface 302. By applying the geometric transformation, the pattern to be projected 307 is obtained.

Figure 3B:
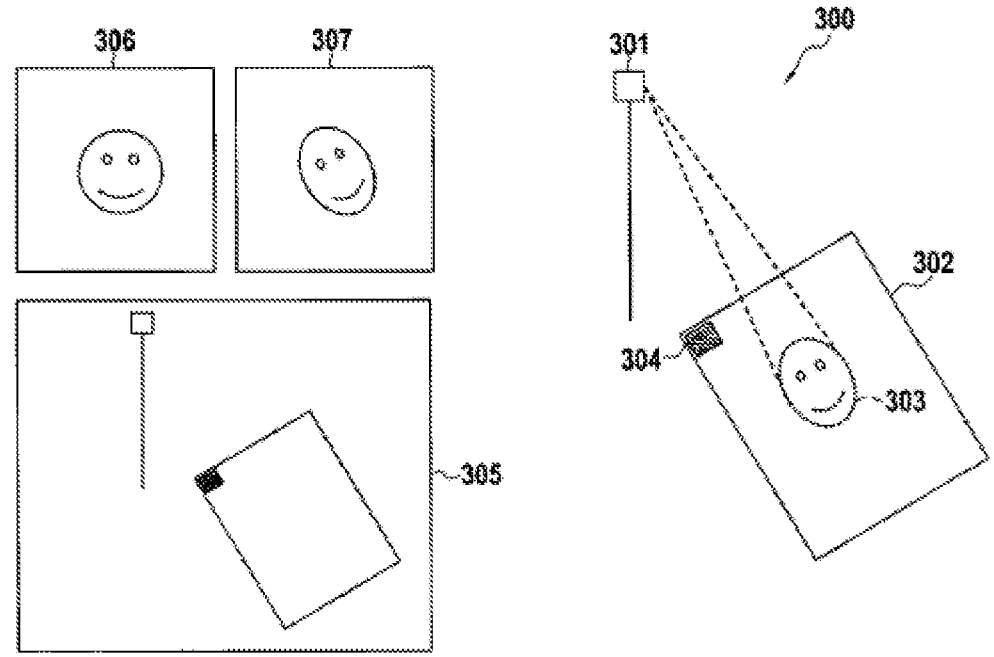

FIG. 3B shows the system 300 after the real surface 302 has been turned. The position of the real surface will be determined again, on the acquired image 305, in order to derive therefrom a new geometric transformation to be applied to the pattern 306. A pattern to be projected 307 is again obtained.

Thus, a user wishing to be able to draw more easily can turn the real surface 302, and the projected pattern 303 will also turn as soon as the system 300 has processed a new acquired image.

Figure 4:
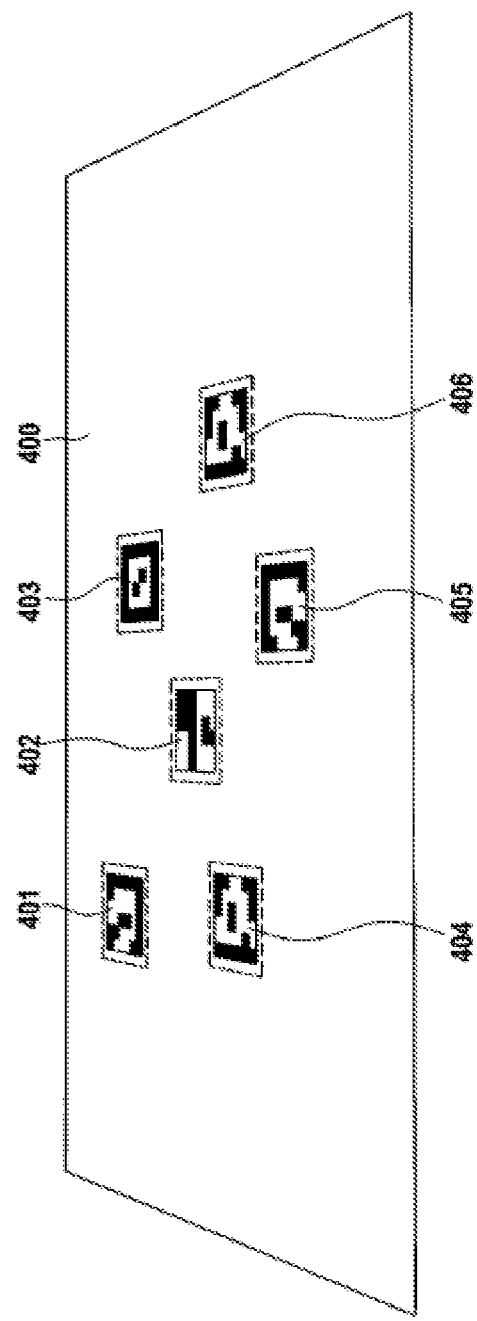
FIG. 4 shows a surface, viewed in an acquired image comprising markings.

FIG. 4 shows a real surface 400 seen by an image acquisition module.

The real surface 400 comprises a plurality of markings 401 to 406 which are all square in shape and have a black and white pattern.

The real surface, and the position of each of the markings, is known before a method as described with reference to FIG. 1 is implemented. In this case, all the markings are different. As a result, detection of a single marking makes it possible to know the position of the real surface 400.

It can be noted that, in order to detect the markings, "thresholding" can be implemented, and then image processing can be implemented in order to identify the square shapes which may be markings. It is then possible to analyze the squares in order to identify the markings.

Figure 5A:
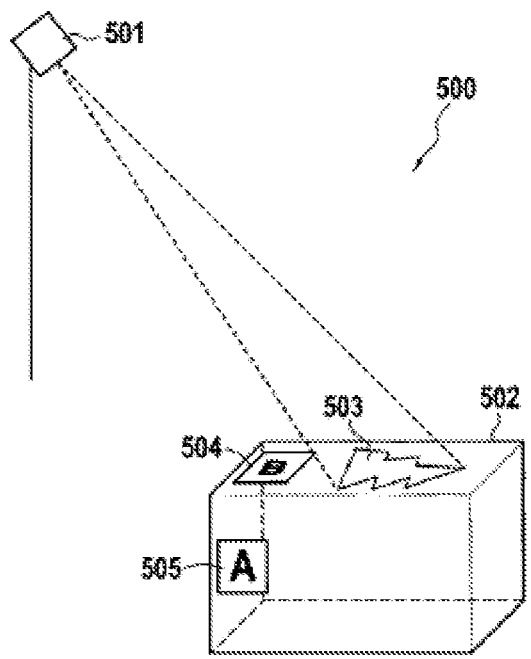
FIGS. 5A and 5B show the projection of a pattern on a real three-dimensional object.

FIG. 5A shows a system for projecting a pattern 500. The system is designed for projection, by means of a video projector 501, onto a three-dimensional object 502.

This figure is shown from the perspective of the image acquisition module used to implement the method for projecting the pattern.

In this case, the three-dimensional object 502 is a parallelepiped, and two of the faces thereof comprise markings 504 and 505 so that they can be identified on the acquired image.

In order to achieve good projection, a virtual parallelepiped can be selected from a library of three-dimensional objects. The object must be positioned in the virtual world, instead and in place of the real object in the real world.

Once it has been positioned, it is possible for the virtual object to be adjusted relative to the real object, for example by projecting the contours (for example a mesh) of the virtual object in order to verify whether they correspond to those of the real object.

Registration of the virtual world can be carried out on the basis of the markings 504 and 505 visible on the acquired image.

In this case, it can be seen that the face of the real object comprising the marking 504 is in the field of the video projector 201, and it is therefore possible to project a portion of the pattern to be represented, onto the face.

For this purpose, in the virtual world, the pattern (a flash of lightning) is applied to the three-dimensional virtual object.

Subsequently, the pattern applied to the object and that as viewed from a perspective associated with the video projector can be projected, and the projected pattern 503 can be obtained. This amounts to determining a geometric transformation to be applied to the pattern. Indeed, it is considered in this case that the video projector is a camera in the virtual world.

It can be noted that, in order to apply the pattern to the three-dimensional virtual object, it is possible to use texture application techniques that are well known in the field of three-dimensional imagery. For example, it is possible to use the programming interface known as "OpenGL," which is well known to a person skilled in the art, for example the version OpenGL 3.3.

Figure 5B:
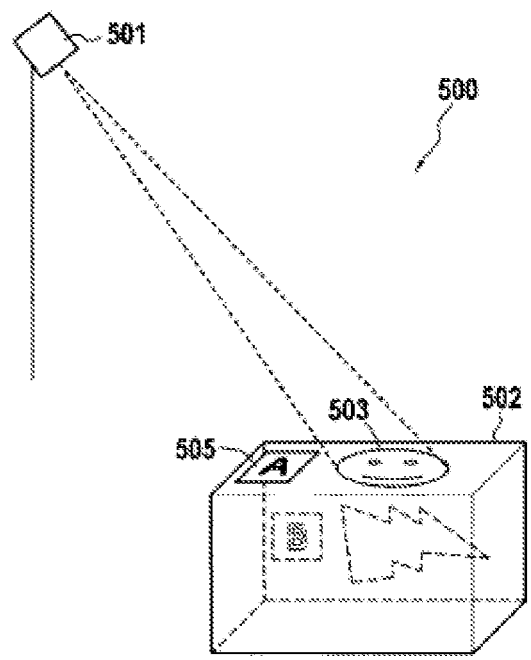

FIG. 5B shows the system 500 after the user has turned the object 502. The face comprising the marking 505 is in the field of the video projector (although it was in shadow in FIG. 5A), and it is therefore possible to project a second portion of the marking 503, in the form of a smiling face. The face comprising the marking 504 is in shadow in the image, and the marking 504 and the flash of lightning that has been implemented are shown transparent.

FIG. 6 shows an embodiment in which a writing instrument 600 is used to draw a pattern 601, while attempting to reproduce a projected pattern 602.

The writing instrument 600 comprises a pattern 603 which, in this case, is in black and white, and which makes it possible to detect the position of the writing instrument on an acquired image, during a method of pattern projection and of implementation. Determining the position of the writing instrument allows for determination of the position of the point of the writing instrument.

From there, it is possible to determine the distance D1 between the point and the projected pattern 602. A person skilled in the art knows to select an appropriate distance determination method.

If the distance D1 is greater than a predefined threshold, a warning can be generated for the user. For example an audible or visual warning, or by vibration.

FIG. 7 shows a variant in which a writing instrument 700 has been used to draw a pattern 701 in order to attempt to reproduce a projected pattern 702.

The pattern which has already been drawn can be seen on the acquired image used for projecting the pattern 702 according to a method as described above, and it is possible to determine the distance D2 between the drawn pattern and the projected pattern. A person skilled in the art knows to select an appropriate distance determination method.

If the distance D2 is greater than a predefined threshold, a warning can be generated for the user. For example an audible or visual warning, or by vibration.

In other applications, it is not necessary to determine the difference between the drawn pattern and the projected pattern. For example, the projected pattern 702 can be projected only following detection that a pattern 703 has been drawn.

This makes it possible to achieve complex drawings in a plurality of steps, or even to achieve drawings in a plurality of colors, by simultaneously projecting the pattern portions associated with one color, before moving on to other pattern portions associated with another color.

FIG. 8A shows a calibration pattern which can be used for calibrating the image acquisition module and also for calibrating the video projector used for implementing a pattern projection method as defined above.

The calibration pattern of FIG. 8A may for example have been printed on a real surface. It will then be observed on an image acquired by an image acquisition module.

The pattern may also be projected by the video projector. An image of the projected calibration pattern can also be acquired for calibration purposes.

FIG. 8B shows the barrel distortion which can be observed during calibration of the image acquisition module or during calibration of the video projector.

FIG. 8C shows the pincushion distortion which can be observed during calibration of the image acquisition module or during calibration of the video projector.

It is also possible to carry out image processing in order to correct these two phenomena and to achieve a precise projection of the pattern.

The embodiments described above make it possible to achieve a preview of a drawing on a real surface, in a manner that makes it possible to make it easier to create a drawing on the real surface.

The invention claimed is:

1. A method for projecting a pattern onto a real surface, the method comprising:
   acquiring an image on which the real surface is visible at least in part,
   determining a geometric transformation to be applied to the pattern such that, once projected by a video projector, the pattern appears in a predefined position of the real surface, wherein determining of the geometric transformation takes into account a position of the video projector and the position of the real surface obtained by means of the acquired image,
   applying the geometric transformation to the pattern,
   projecting the pattern using the video projector; and
   detecting the position of a writing instrument on the acquired image, wherein the detection of the position of the writing instrument is implemented by detecting a detection pattern that is on an outer surface of the writing instrument and is visible on the acquired image, at least in part,
   wherein the method further comprises detecting a pattern drawn by a user on the real surface, wherein an alert is automatically generated in real time if the position of the pattern drawn by the user differs from a position of an expected pattern.

2. The method according to claim 1, wherein the acquired image includes at least a portion of a marking associated with the real surface that is visible, the at least one portion of the marking being detected, and determining of the geometric transformation taking account of the detection of the marking.

3. The method according to claim 2, wherein the pattern is projected in a zone of the real surface that is separate from that comprising the marking.

4. The method according to claim 2, wherein at least a portion of an additional marking associated with the real surface is also visible on the acquired image, the at least one portion of the additional marking being detected, and determining of the geometric transformation taking account of the detection of the additional marking.

5. The method according to claim 1, wherein the geometric transformation comprises a homography.

6. The method according to claim 1, wherein the real surface is a surface of a three-dimensional real object, the method further comprising:
   registering a virtual world on the basis of the acquired image,
   placing a three-dimensional virtual object in the registered virtual world,
   applying the pattern to the three-dimensional virtual object, wherein the pattern is a first pattern, and projection of the first pattern comprises projection of the first pattern applied to the three-dimensional virtual object and that as viewed from a perspective associated with the video projector when a first marking on the first surface of the three-dimensional real object is detected in the acquired image, and wherein the first pattern is projected on to the first surface of the three-dimensional real object, and the method includes applying a second pattern to the three-dimensional virtual object, wherein the second pattern is different than the first pattern, the method includes projecting the second pattern onto a second surface of the three-dimensional real object that is offset from the first surface, wherein the second pattern is projected when a second marking on the second surface is detected in the acquired image, wherein the second marking is different than the first marking.

7. The method according to claim 6, wherein the three-dimensional virtual object is selected from a library of three-dimensional virtual objects.

8. The method according to claim 6, further comprising a preliminary step of adjusting the three-dimensional virtual object.

9. The method according to claim 1, further comprising preliminary calibration of an image acquisition module that is used for the image acquisition, and wherein an image is acquired on which a first calibration pattern is visible at least in part.

10. The method according to claim 1, further comprising preliminary calibration of the video projector, and wherein a second calibration pattern is projected, and an image is acquired in which the second calibration pattern is visible at least in part.

11. A method for projecting a pattern onto a real surface, the method comprising:
acquiring an image on which the real surface is visible at least in part,
determining a geometric transformation to be applied to the pattern such that, once projected by a video projector, the pattern appears in a predefined position of the real surface, wherein determining of the geometric transformation takes into account a position of the video projector and the position of the real surface obtained by means of the acquired image,
applying the geometric transformation to the pattern,
projecting the pattern using the video projector, and
detecting a pattern drawn by a user on the real surface, wherein an alert is automatically generated in real time if the position of the pattern drawn differs from a position of an expected pattern.

12. A system for projecting a pattern on a real surface, the system comprising:
an image acquisition module,
a video projector,
a processor,
a memory comprising instructions that can be executed by the processor for:
acquiring, by the image acquisition module, an image on which a real surface is visible at least in part,
determining a geometric transformation to be applied to the pattern such that, once projected by a video projector, the pattern appears in a predefined location of the real surface, wherein determining of the geometric transformation takes account of the position of the video projector and of the position of the real surface obtained from the acquired image,
applying the geometric transformation to the pattern, and
projecting the pattern using the video projector, wherein the pattern is a first pattern,
only after detecting that the first pattern has been drawn onto the real surface, projecting a second pattern, different from the first pattern, using the video projector.

13. The system according to claim 12, further comprising a writing instrument having a non-symmetrical and high contrast marking, the memory further comprising instructions for determining a location of the writing instrument taking account of the detection of the marking.

14. A non-transitory computer-readable storage medium for storing instructions that, when executed by one or more processors, perform the method according to claim 1.

15. A non-transitory computer-readable storage medium for storing instructions that, when executed by one or more processors, perform the method according to claim 11.

16. The method of claim 1, wherein the alert is automatically generated in real time when a distance between the pattern drawn by the user and the expected pattern exceeds an expected threshold.

17. The method of claim 1, wherein the detection pattern includes a high contrast pattern on an outer surface of the writing instrument.

18. The method of claim 1, wherein the method further comprises detecting a pattern drawn on the real surface, wherein an alert is automatically generated in real time if the position of the pattern drawn by the user differs from an expected pattern,
wherein the alert includes causing a vibration in the writing instrument or generating an audio alert, or generating a visual alert onto the real surface,
wherein the alert is automatically generated in real time when a distance between the pattern drawn by the user and the expected pattern exceeds an expected threshold, wherein the detection pattern includes a high contrast pattern on an outer surface of the writing instrument.

19. The method of claim 1, wherein the pattern is a first pattern, and the method includes:
detecting whether the first pattern has been drawn onto the real surface,
only after detecting that the first pattern or an approximation of the first pattern has been drawn onto the real surface, projecting a second pattern onto the real surface,
detecting whether the second pattern has been drawn onto the real surface,
only after detecting that the second pattern or an approximation of the second pattern has been drawn onto the real surface, projecting a third pattern onto the real surface, wherein the first pattern, the second pattern, and the third pattern are different from one another.

* * * * *